United States Patent

Zefferer et al.

[11] Patent Number: 5,786,561
[45] Date of Patent: Jul. 28, 1998

[54] NOZZLE ASSEMBLY FOR LASER BEAM CUTTING

[75] Inventors: Hartmut Zefferer, Aachen, Germany; Dirk Petring, Kerkrade, Netherlands

[73] Assignee: Fraunhofer-Gesellschaft Zur Forderung Der Angewandten Forschung E.V., Munich, Germany

[21] Appl. No.: 682,529

[22] PCT Filed: Jan. 18, 1995

[86] PCT No.: PCT/DE95/00050

§ 371 Date: Jul. 23, 1996

§ 102(e) Date: Jul. 23, 1996

[87] PCT Pub. No.: WO95/19865

PCT Pub. Date: Jul. 27, 1995

[30] Foreign Application Priority Data

Jan. 25, 1994 [DE] Germany .................. 4402000.7

[51] Int. Cl.⁶ ............................................. B23K 26/14
[52] U.S. Cl. ............................. 219/121.84; 219/121.67
[58] Field of Search ...................... 219/121.84, 121.5, 219/121.67

[56] References Cited

U.S. PATENT DOCUMENTS 4,121,085  10/1978  Diemer et al. ............... 219/121.84
5,418,350  5/1995   Freneaux et al. ............ 219/121.84

FOREIGN PATENT DOCUMENTS

| 3630127 | 3/1987  | Germany | 219/121.84 |
| 3637568 | 5/1988  | Germany | 219/121.84 |
| 4016181 | 11/1991 | Germany | 219/121.67 |
| 4016200 | 11/1991 | Germany | 219/121.84 |
| 4133198 | 4/1993  | Germany | 219/121.84 |
| 59-87996 | 5/1984 | Japan   | 219/121.67 |
| 5-84589 A | 4/1993 | Japan |            |

*Primary Examiner*—Geoffrey S. Evans
*Attorney, Agent, or Firm*—Herbert Dubno; Yori Kateshon

[57] ABSTRACT

A nozzle assembly for laser beam cutting has a nozzle body shaped like a truncated cone fitting the focussed laser beam and surrounding the same. The assembly has a passage bore for the laser beam, with a nozzle sleeve concentrically surrounding the nozzle body and forming an annular gap therewith. An outlet bore is coaxial with the passage bore for a cutting gas stream from an annular gap connected to a gas source. The outlet bore is located on the workpiece side in front of the passage bore and has a diameter (D) exceeding the diameter (d) of the passage bore. In order to insure that the deflection of the gas stream from the nozzle takes place parallel to the axis of the laser beam, with a minimum of flow loss, the nozzle assembly is built so that the outlet cross section of the outlet bore is approximately the same as the transition cross section of the annular gap to the outlet bore.

9 Claims, 8 Drawing Sheets

NOZZLE ASSEMBLY FOR LASER BEAM CUTTING

CROSS REFERENCE TO RELATED APPLICATIONS

This application is a national stage of PCT/DE95/100050 filed 18 Jan. 1995 and based upon German national application P44 02 000.7 of 25 Jan. 1994 under the International Convention.

FIELD OF THE INVENTION

The invention relates to a nozzle assembly for laser beam cutting, which has a frustoconical nozzle body surrounding the focussed laser beam, having a nozzle sleeve concentrically surrounding the nozzle body and forming an annular gap therewith, the sleeve having an outlet opening coaxial with a passage bore for a stream of cutting gas flowing from the annular gap connected to a gas source, whereby the outlet opening is located on the side of the workpiece in front of the passage bore and has a diameter which exceeds the diameter of the passage bore.

BACKGROUND OF THE INVENTION

A nozzle assembly is known from JP-84589 A in: "Patent Abstracts of Japan" 1993, Vol. 17/No. 410, Sec. M-1455. The wall of the nozzle sleeve forming the annular gap projects by more than 0.5 to 5 mm beyond the end of the nozzle body, in order to achieve a perfect shield against the environmental air.

U.S. Pat. No. 4,121,085 describes a nozzle assembly for laser beam cutting, which has a nozzle body in the shape of a truncated cone fitting the focussed laser beam and surrounding it, with a passage bore for the laser beam, with a nozzle sleeve concentrically surrounding the nozzle body at a distance. The sleeve, coaxially with the passage bore has an outlet opening for the cutting gas beam on the workpiece side in front of the passage bore of the nozzle body. The delivery cross section of the outlet opening is smaller than the cross section of the inlet into the space between the nozzle body and the nozzle sleeve. In this way a reverse gas flow is supposed to be generated, with the purpose of cutting the air flow to the workpiece.

DE 36 37 568 A1 describes a nozzle assembly for laser beam cutting, which has nozzle body shaped like a truncated cone, fitted to and surrounding the focussed laser beam, with a passage bore for the laser beam, with a nozzle sleeve concentrically surrounding the nozzle body forming an annular gap therewith, the sleeve having an outlet opening, which is coaxial with the passage, for a cutting gas supplied by a gas source. In this known nozzle arrangement the nozzle sleeve is screwed onto the nozzle body and is provided on the inside surface of the sleeve with individual longitudinal grooves, separated from each other. When the sleeve is slightly unscrewed, a conical annular gap is created between the sleeve and the nozzle body. The annular gap surrounds the passage of the nozzle body at a distance which is determined by the wall thickness of the nozzle body in the area of the passage bore. The exiting cutting gas beam is like a hollow cylinder. This known nozzle arrangement can also be used for cutting, but is not specialized for this operation and creates a relatively large cutting kerf due to the hollow cylindrical shape of the burning gas beam.

DE 38 24 047 A1 describes a nozzle assembly with a nozzle sleeve, which concentrically surrounds a nozzle body shaped like a truncated cone and has a bore arranged on the workpiece side in front of the passage bore. By means of this bore of the known nozzle assembly a negative pressure is generated on the workpiece surface, in that the annular gap between the nozzle sleeve and the nozzle body is subjected to suction. A considerable beam disturbance takes place in the area of the outlet bore, so that this particular nozzle arrangement is not suited for laser beam cutting, especially in the case of high cutting efficiency and/or high cutting gas pressures, for instance with laser power exceeding 3 kW and gas pressure of more than 10 bar.

In order to be able to cut workpieces at high cutting speeds it is known to use cutting gas supplied at high velocities for blowing away the material from the cutting clearance. The velocity of the cutting gas lies within the ultrasonic range. From DE 36 30 127 A1 such a nozzle assembly for laser beam cutting is known, which has a nozzle body shaped like a truncated cone, surrounding and fitting a focussed laser beam, with a passage bore for the laser beam and which has a nozzle sleeve concentrically surrounding the nozzle body, which together with the nozzle body forms several gas stream channels connected to a gas source. The channels end on the workpiece side of the passage bore for the laser beam in a common chamber, from which, at correspondingly measured pressures, a single gas beam emerges through an outlet bore at supersonic velocities. Thereby a considerably slower gas shield is provided against the entrainment of gas from the surrounding atmosphere. The outlet bore is formed by a protection cap screwed to the nozzle sleeve, which is meant as a protection against contaminations resulting from the cutting. In the above-mentioned nozzle arrangement the diameter of the outlet bore is smaller than the diameter of the passage bore for the laser beam. A gas stream results which could still be improved upon from the point of view of flow losses and of the course of the cutting gas stream in the cutting clearance.

OBJECT OF THE INVENTION

It is therefore the object of the invention to improve a nozzle assembly so the features described in the introduction, so that the gas beam leaving the nozzle is guided through the nozzle mouth towards the workpiece with minimal stream losses, namely impulse or flow rate losses.

SUMMARY OF THE INVENTION

This object is achieved by making the exit cross section of the outlet bore approximately equal to the transition cross section of the annular gap towards the outlet bore.

It is important for the invention that a flow optimization takes place in the area of the nozzle outlet. In the outlet of the converging gap, the gas beam present in annular shape due to the annular gap is deflected parallel to the nozzle axis and exits fully as a solid free stream from the nozzle mouth, or from the outlet bore of the nozzle. The deflection of the annular stream in the area of the nozzle mouth takes place with a minimum of impulse loss, since it does not form compression waves. The free stream expands only outside the nozzle mouth in the direction of the laser beam axis to reach ultrasonic velocities.

As a result of the low flow loss during the deflection of the annular beam into the outlet bore, the leakage of gas beam in the laser passage bore is also reduced. The reduced leak gas stream lowers also the admixture of environmental air in the gas stream.

In order to achieve an optimal cutting gas stream inside the nozzle assembly, whose flow losses are as low as possible, the nozzle assembly is built so that the annular gap and the gas pressure are measured so that the gas is accelerated only up to sonic velocity as a result of the surface reduction of the gap cross section towards the outlet bore. Compression waves can be safely avoided, so that flow losses are minimized.

A further reduction of flow losses can be achieved by decreasing as continuously as possible the transition cross section of the annular gap towards the outlet bore due the configuration of the wall of the nozzle sleeve.

Preferably, the gap widths of the annular gap are dimensioned approximately as follows:

$$s = D/(2 \cos (\alpha_s)) * (1-(1-\cos (\alpha_s))^{0.5})$$

s=gap width
D=diameter of the outlet bore
$\alpha_s$=inclination angle of the annular gap.

Particularly at higher cutting speeds it is desirable that the nozzle be at a slightly greater distance from the workpiece. In this case it has to be insured that the gas beam does not expand and maintains its mechanical action within the cutting clearance. In order to achieve this, the nozzle assembly is built so that the outlet bore communicates with a nozzle recess, whose configuration allows for the expansion of the beam up to supersonic speed in a guided manner.

The diameter of the passage bore of the nozzle body is to be kept as small as possible, so that an influence on the gas stream is avoided and thereby the leakage losses through the inner space of the nozzle can be kept low. This is achieved when a suitable design of the nozzle assembly is characterized in that the diameter of the passage bore is equal to or greater than 1.5 times the diameter of the laser beam in the area of the passage bore.

From the point of view of the laser beam focussing means, nozzle assemblies have various designs. When focussing lenses are used, it is necessary to build the nozzle arrangement so that the focussing lens and/or a shutter window transmitting the laser beam are not destroyed by the maximum possible cutting gas pressure. When the nozzle assembly is provided with such a shutter window traversed by the laser beam, it makes sense to build it so that pressure-relief bores are provided in the inner space of the nozzle body closed off by a transmitting element in the access area of the laser beam. Particularly the pressure-relief bores can reduce possible pressure peaks, so that the transmitting shutter window, or the focussing lens will not be damaged.

The nozzle assembly can be built so that the inner space of the nozzle body closed off by a transmitting element in the access area of the laser beam will be connected to a gas source. Thereby the inner space of the nozzle body is supplied in a conventional way by gas, which escapes through the passage bore for the laser beam and flows centrally into the gas of the annular gap.

The nozzle assembly can be further developed so that the nozzle body shaped like a truncated cone is frustoconical nozzle body surrounded by an outer nozzle sleeve forming a further coaxial annular gap therewith, and can be the two annular gaps can be connected to the same or to different fluid sources. This embodiment is particularly suitable for nozzle assemblies which are used in connection with an optical mirror system. When both annular gaps are connected to the same gas source, the resulting cutting gas beam can be created with pressure and/or pressure flow ratios varying over its cross section. When the two annular gaps are connected to different gas sources, the corresponding pressure and/or pressure flow ratios of the combined separate beams result. In special cases, instead of the gas, a liquid can be used as fluid.

The further annular gap can end in the outlet bore or in a separate gap mouth surrounding the outlet bore at a distance. In the first instance the outer onflowing fluid becomes a component of the central gas beam, whereby the formation of the gas beam can be influenced through the design of the mouth of the further annular gap. In the second instance a separate beam results, which for example is used for influencing workpiece areas around the cutting beam, e.g. to shield them.

An additional gas beam has often to meet different requirements. For instance it can be that the gas consumption should be low. For this case the nozzle arrangement so that an annular gap for the formation of an additional gas beam connected to a bore which ends next to the outlet bore. Preferably this bore is parallel to the nozzle axis.

For similar special purposes the nozzle assembly can also be built so that the nozzle sleeve has a vertical slot emerging from the annular gap in which the outlet bore is integrated.

BRIEF DESCRIPTION OF THE DRAWING

The above and other objects, features and advantages will become more readily apparent from the following description, reference being made to the accompanying drawing in which.

Figure 1:
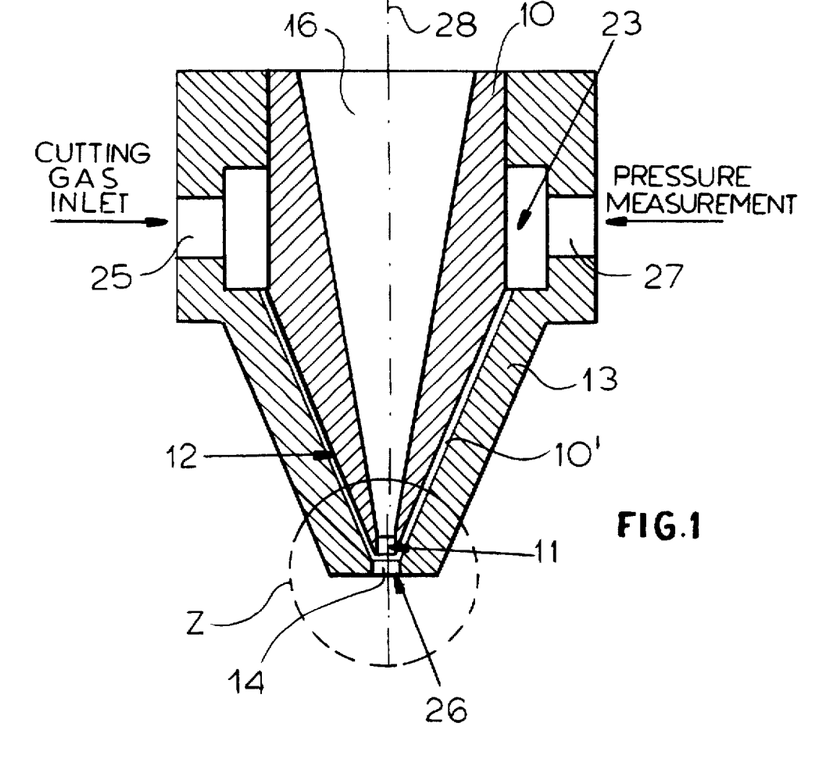
FIG.1 is a schematic cross section of a nozzle assembly according to the invention.

The nozzle assembly 34 of the invention consists basically of a nozzle body 10, with an inner space 16, which is correspondingly fitted to the focussed laser beam not shown in the drawing, which means that it narrows down corresponding to the focussed laser beam interior of the nozzle body 10 and vice versa. At the end of the nozzle body 10 on the workpiece side, shown as the lower end in the drawing, a passage 11 for the laser beam is provided in the form of a cylindrical bore. The diameter d of this passage bore 11 should be as small as possible and corresponds to the diameter of the focussed laser beam $d_L$ at this point. As a rule of the thumb the following formula approximately applies: $d > 1.5 \times d_L$.

The nozzle body 10 is surrounded by a nozzle sleeve 13, which has a complex construction. In the region of the lower end of the nozzle body 10 the nozzle sleeve 13 is shaped similarly to the nozzle body 10 like a truncated cone. However it is slightly spaced away from the outer circumference 10' of the nozzle body 10, so that an annular gap 12 is formed. This annular gap 12 extends from a plenum 23 connected with a gas inlet 25, to a nozzle mouth 26, where an outlet bore 14 is provided in the nozzle sleeve 13. A continuous, uniform flow connection results between the gas inlet 25 and the nozzle mouth 26. The plenum 23 is an annular space surrounding the nozzle body 10, to which, apart from the gas inlet, a connection bore 27 for pressure measurements is also connected. As a result a cutting gas supply through the gas inlet 25 can be delivered depending on a pressure measurement so that buildup of working gas pressure inside the nozzle reaches a certain predetermined value, or does not exceed or fall below this value. The buildup of the working gas pressure is caused by the narrowing of the flow cross section of the annular gap 12, from the plenum 23 to the nozzle mouth 26. Here the cutting gas is accelerated to a maximum up to the speed of sound.

The different embodiments of the detail Z in FIG. 1 illustrated in the FIGS. 2a to 2d refer mainly to the configuration of the transition between the flow cross section of the annular gap 12 and the flow cross section of the outlet bore 14. The transition cross section is determined in FIG. 2a by the fact that the nozzle body 10 has the shape of a truncated cone, while the nozzle sleeve 13 is also shaped like a truncated cone on the outside, but on the inside it has a configuration of the wall 36, which basically has the shape of a curved funnel and is continuously bent in the transition area between the annular gap 12 and the nozzle mouth 26, so that a circumferentially running edge does not exist. Correspondingly the transition cross section is continuously reduced, as can be seen from the diagram located next to FIG. 2a, wherein the flow cross section A is plotted as a function of the course coordinate or distance u. To the course coordinate $u_1$ corresponds a flow cross section $A_1$ which is greater than the flow cross section surface $A_2$ corresponding to the course coordinate $u_2$ at the nozzle mouth 26. The diagram represents the desired continuous reduction of the transition cross section. It is assumed in this plot that the peripheral surface of the nozzle body 10 was fully present up to the cone point 38 and that therefore an effective disturbance through the passage bore 11 can not occur. It is apparent that the flow cross section surface narrows without interruption towards the nozzle mouth 26.

Figure 2:
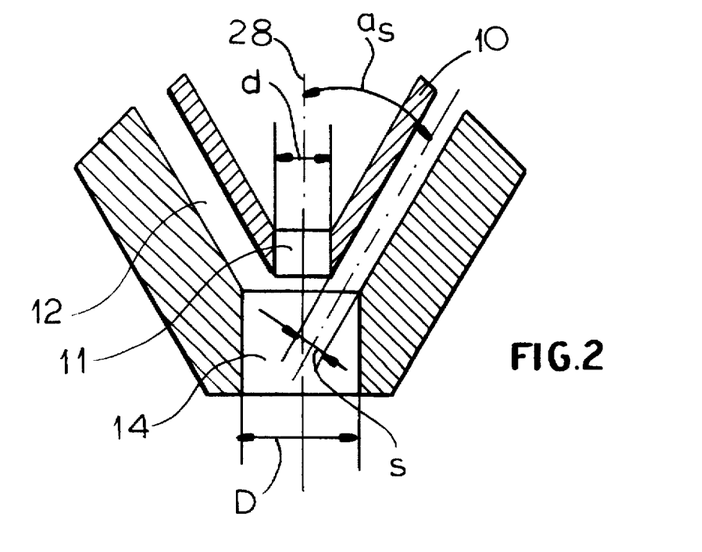
FIGS. 2, 2a, 2b, 2c are details of the region Z of FIG. 1 in various embodiments according to the invention.
Figure 2A:
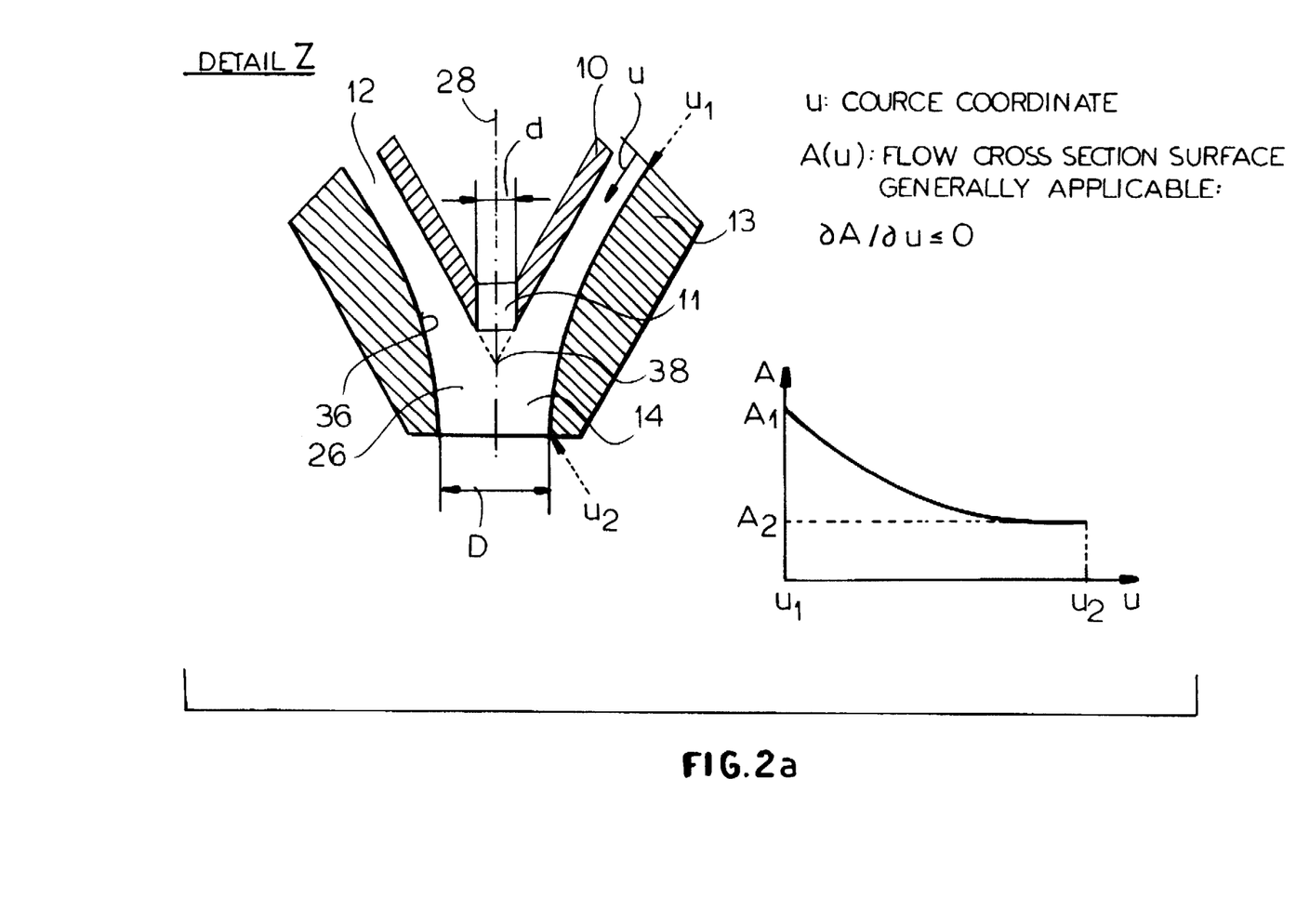
Figure 2B:
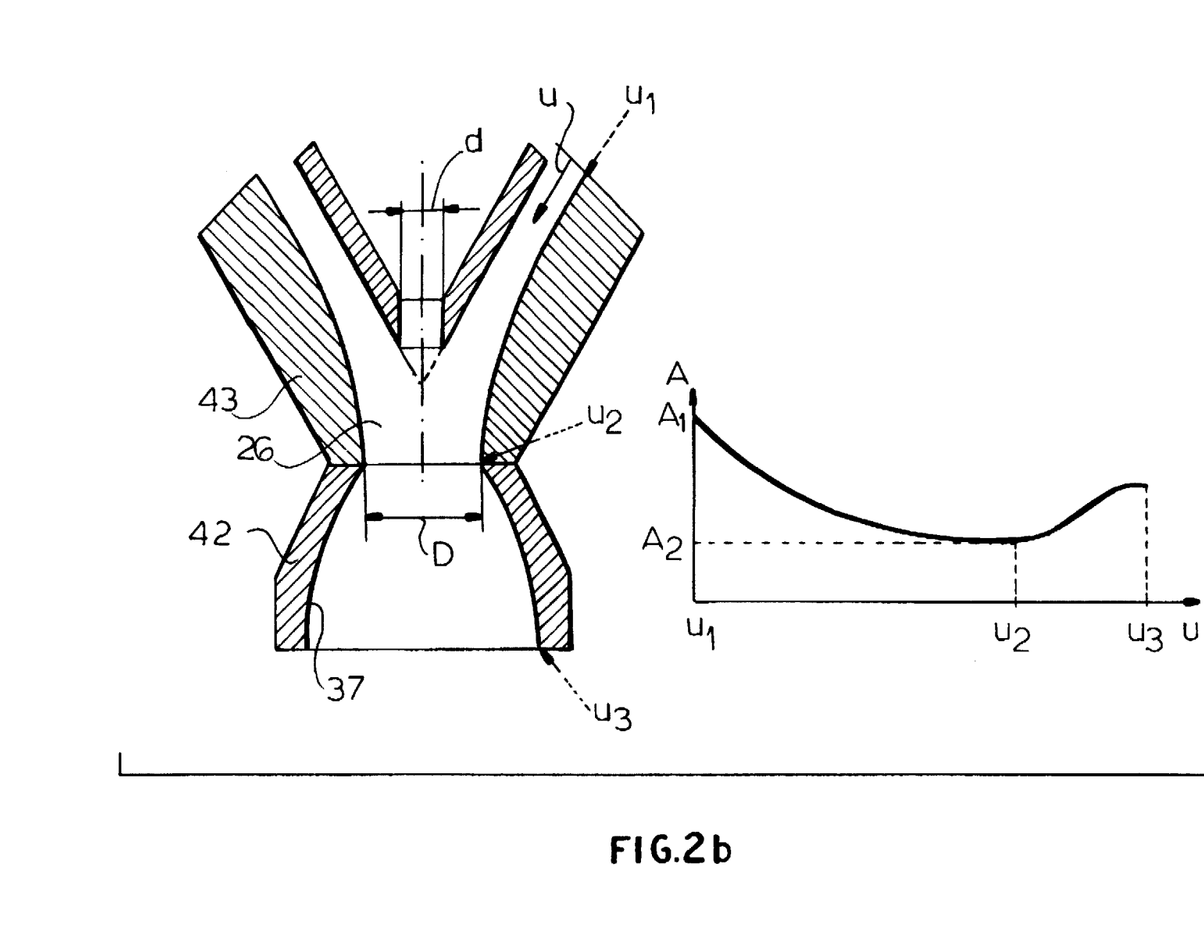
Figure 2C:
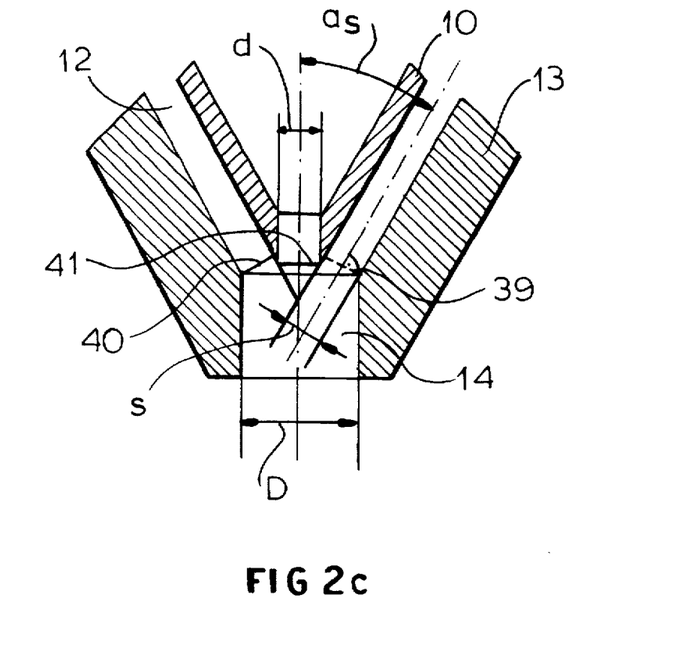
Figure 2D:
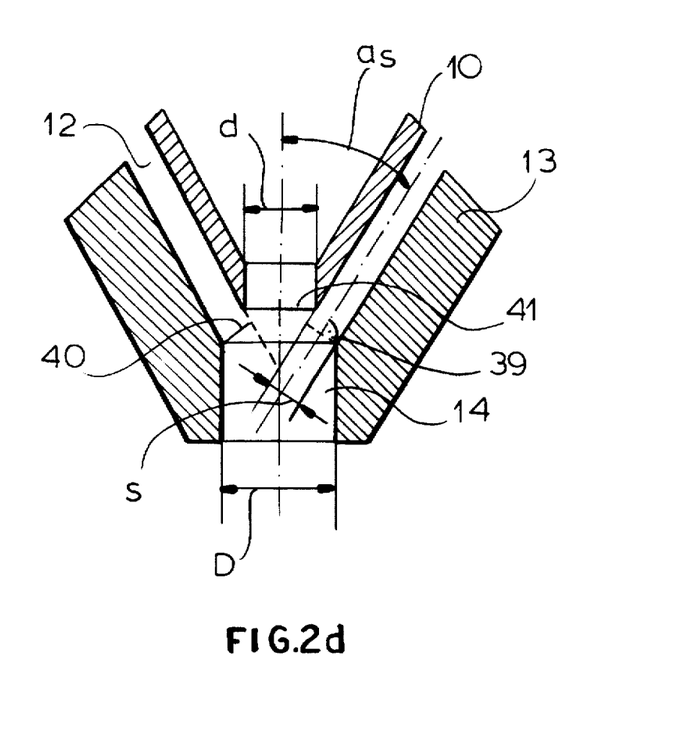

In the FIGS. 2c and 2d the passage bore 11 and the outlet bore 14 are each cylindrical. These configurations can be manufactured in the simplest manner. The width of the annular gap 12 is constant up to the cylindrical outlet bore 14. By comparing FIGS. 2c and 2d it can be seen that the outer peripheral surface of the nozzle body 10 is the same and has the same position in each of them. The transition cross section from the annular gap 12 to the outlet bore 14 is located here as defined at the peripheral edge 39 of the nozzle sleeve 13 and lies perpendicularly to the outer peripheral surface of the nozzle body 10. The transition cross section is indicated at 40 in FIGS. 2c and 2d. In a comparison of FIGS. 2c and 2d it will be apparent that the lower edge 41 of the nozzle body 10 is closer to the peripheral edge 39, the smaller is the diameter d of the passage bore 11. The smaller the diameter d is, the deeper the nozzle body 10 plunges in the direction of the outlet bore 14, without changing the position of its peripheral surface.

Furthermore it is of primary importance that the diameter D of the outlet bore 14 be greater than the diameter d of the passage bore 11 for the laser beam. The gap width s according to FIG. 2 is also important. All mentioned values have to be interrelated in such a manner that the gas beam formed through the annular gap 12 is deflected in the direction of the laser beam axis 28 with possible losses. Thereby one starts from the following relation:

$$A_D = \pi D^2/4$$

Further the following applies:

$$A_s = \pi s (D - s \cos(\alpha_s))$$

where

D=diameter of the outlet bore 14
d=diameter of the passage bore 11 for the laser beam
s=the gap width
$\alpha_s$=inclination angle of the gap
$A_s$=outlet area of the gap
$A_D$=outlet area of the outlet bore 14.

For a flow of the gas beam which is as much as possible free from losses, it is important that As be approximately equal to AD, it follows from the two previously mentioned equations that:

$$s = D/(2(\cos(\alpha_s)) * (1-(1-\cos(\alpha_s))^{0.5})$$

The diameter of the outlet bore 14 is usually around 2 mm. The angle $\alpha_s$, should be as sharp as possible. But since the shape of the focussed laser beam limits the angle $\alpha_s$, normally an angle of the magnitude $\alpha_s=30°$ is assigned. The required gap width is then s=0.73 mm.

The nozzle mouth 26 in FIG. 2b corresponds to the one in FIG. 2a, but has in addition a nozzle crown 42 which is provided at the nozzle point 43. The fastening of the nozzle crown 42 on the nozzle point 43 takes place for instance by jointing. It is also possible to make them in one piece. The nozzle recess 37, allows the cutting gas beam exiting the outlet bore 14 to expand in a controlled manner to ultrasonic speed. This is particularly advantageous in applications where the cutting gas beam has to preserve its constant characteristics over a longer distance between the work head and the workpiece. It is especially important that it does not widen and that it develops in the cutting clearance the desired mechanical features related to blowing away of the burned material. The diagram arranged next to FIG. 2b represents the dependence of the flow cross section surface A on the course coordinate u within the nozzle crown 42, whereby the increase of the cross sectional area outside the region of the nozzle mouth 26 will be apparent.

Figure 3:
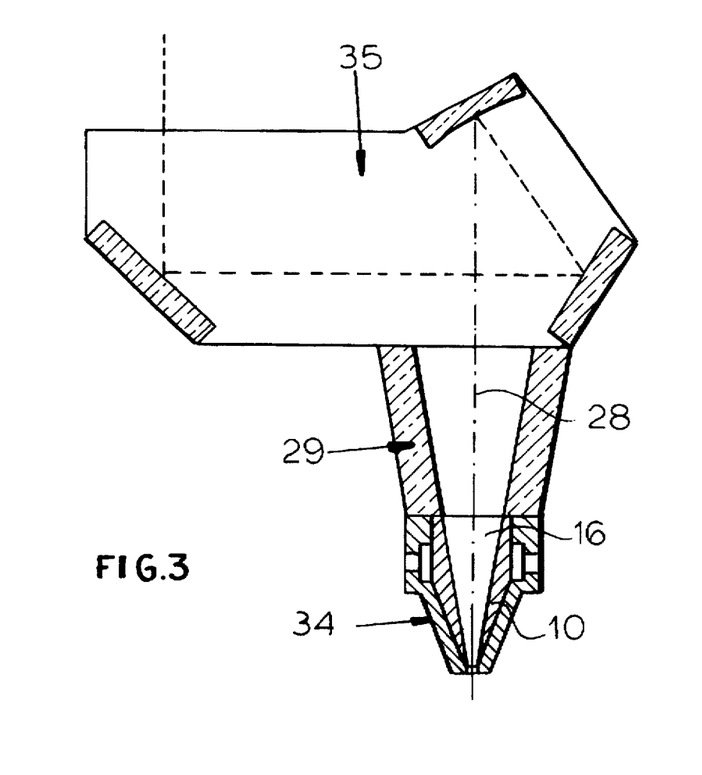
FIGS. 3 and 4 are cross sectional views showing various usages of the nozzle assembly according to FIG. 1 with or without transmitting shutter window.

The aforedescribed basic constructions of the nozzles can be advantageously used in various configurations. FIG. 3 shows a nozzle assembly which is used in association with a nozzle mounting 29 together with an optical mirror system 35, which guides the laser beam along the broken and dash-dot line. The dash-dot line represents the laser beam axis 28 of the focussed laser beam, which is directed through the nozzle assembly 34, and though the nozzle body 10 onto the workpiece to be cut.

Figure 4:
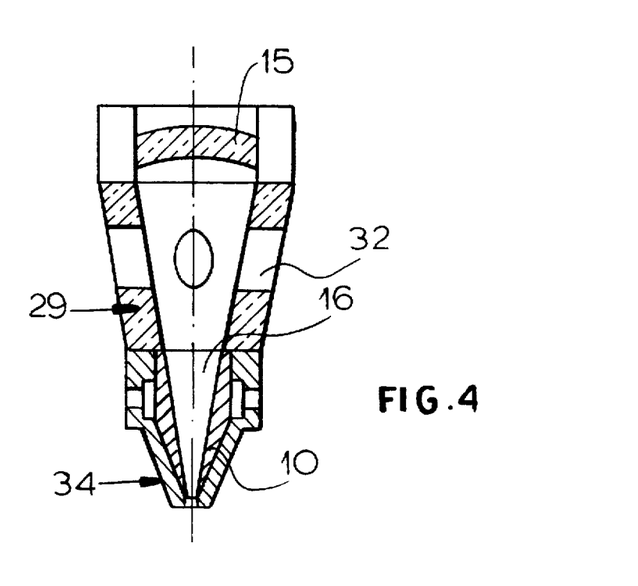

In FIG. 4 the laser beam is focussed with a transmitting element 15, namely a lens, which upwardly closes off the inner space 16 of the nozzle body 10. A cutting gas stream with a static pressure is formed, which does not depend on the mechanical destruction threshold of the transmitting element 15. Pressure-relief bores 32 can be provided for the pressure relief of the transmitting element, namely the lens 15.

Figure 5:
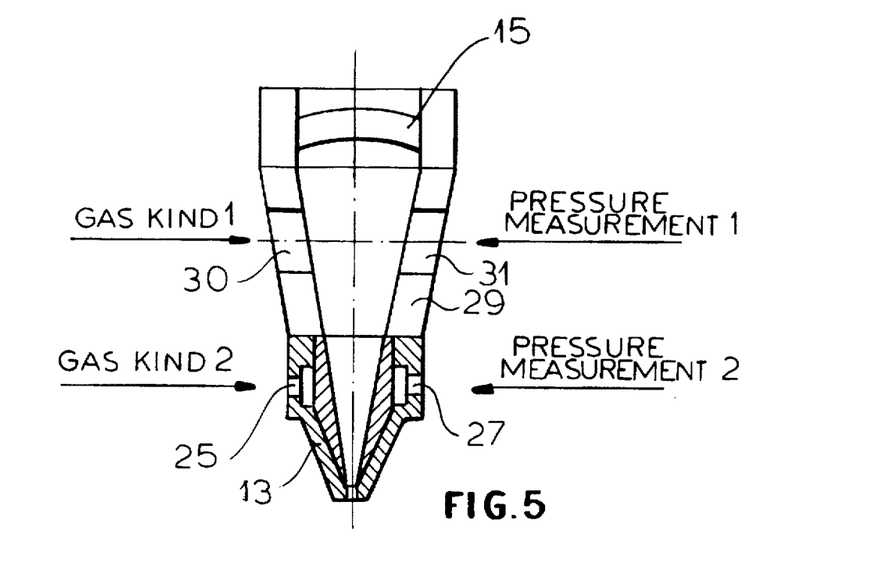
FIGS. 5 and 6 are cross sectional views of different embodiments of the nozzle assembly according to the invention for radial and axial mixing of different gases.

For some cutting applications it could be necessary to introduce in the center of the gas stream a type of gas which is different from the peripheral gas. This for instance is advantageous in flame cutting, when close to the middle of the gas stream which coincides with the laser beam axis, pure oxygen is introduced in order to improve the energy coupling, while at the periphery of the gas stream a gas which inhibits the oxidation process, such as nitrogen or a liquid such as water, is used. A radial mixing or layering can be achieved by introducing centrally one gas or gas mixture, namely through the inner space 16 of the nozzle body 10, through which the focussed laser beam is also sent. The second component of the gas stream can then be supplied through the annular gap 12, so that the desired coherent, but radially and axially differently mixed gas stream results. The dosage of the blend is performed through the pressure ratio and/or flow ratio of the combined individual gas flows. In addition the dosage, respectively the flow can be set by a mechanical adjustment of the gap, in the sense of a change in the gap width. For the central supply of gas a transmitting closing element 15 is required, as shown in FIG. 5. Through the bore 30 of the nozzle mounting 29 the gas supply of gas kind 1 takes place and the bore 31 serves for the pressure measurement 1 of this gas. The second kind of gas is introduced through the gas inlet 25 of the sleeve 13, at whose bore 27 the second pressure measurement takes place.

Figure 6:
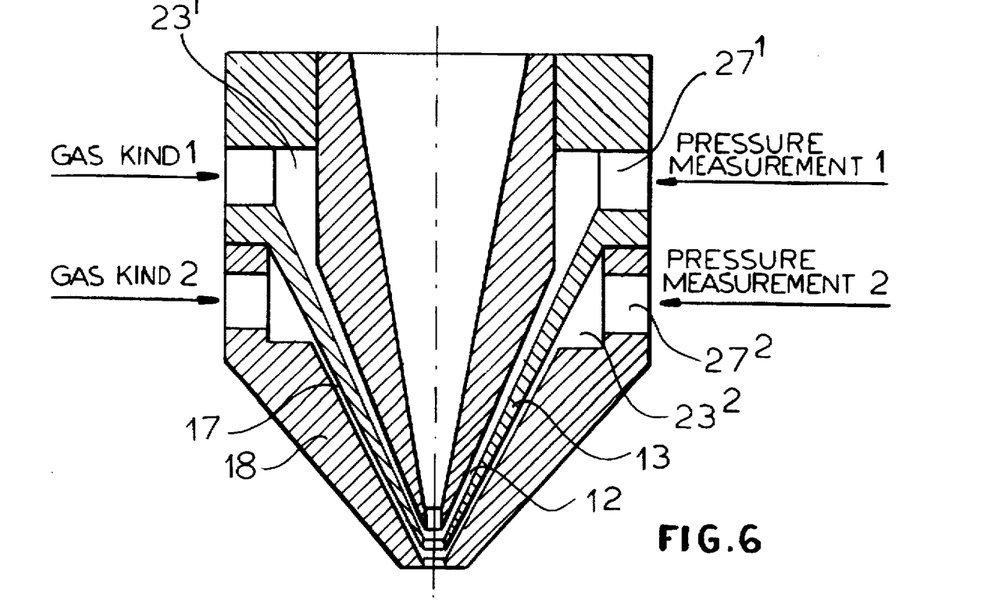

If a transmitting closing element 15 according to FIG. 5 is not feasible, according to FIG. 6 a nozzle can be employed which besides the nozzle sleeve 13 has a further outer nozzle sleeve 18 surrounding the first, which together with the outer circumference of sleeve 13 encloses a further coaxial annular gap 17. While the inner annular gap 12 is connected to the reservoir $23^1$, the outer annular gap 17 is in connection with a further reservoir $23^2$, each of them having a separate gas inlet for the two gas kinds, each also having a connection $27^1$ and $27^2$ for pressure measurement.

Figure 7:
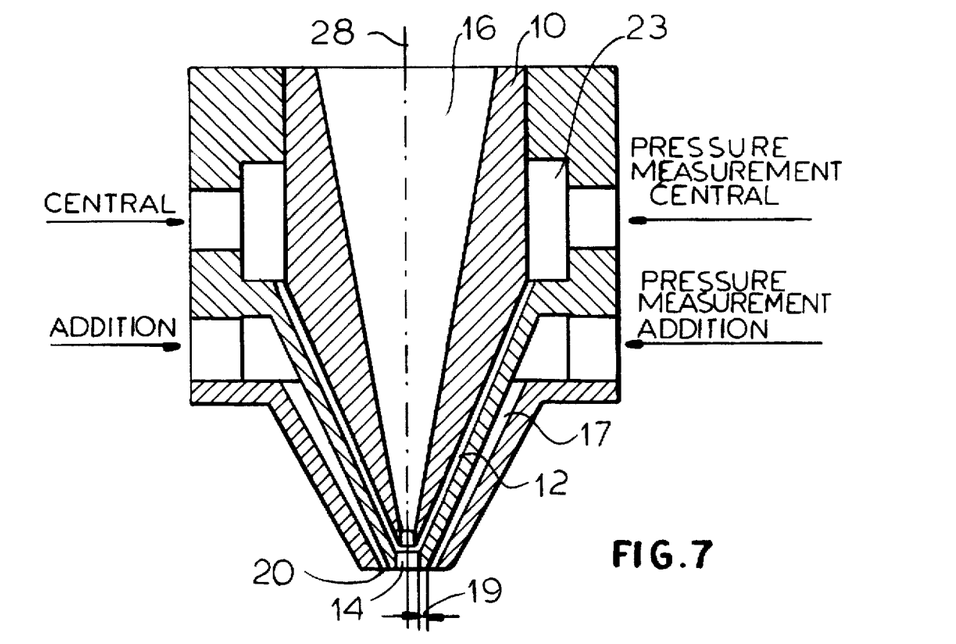
FIGS. 7 and 8 are cross sectional views of different embodiments of the nozzle assembly according to the invention for producing additional gas streams.

The two kinds of gas join at the nozzle mouth. According to FIG. 6 the outer annular gap 17 ends in the outlet bore 14. By contrast FIG. 7 shows that the further annular gap 17 has a gap mouth 20 which is at a distance 19 from the outlet bore 14 and also surrounds the latter with the same distance 19. A corresponding formation of separate concentric gas beams is to be expected.

Figure 8:
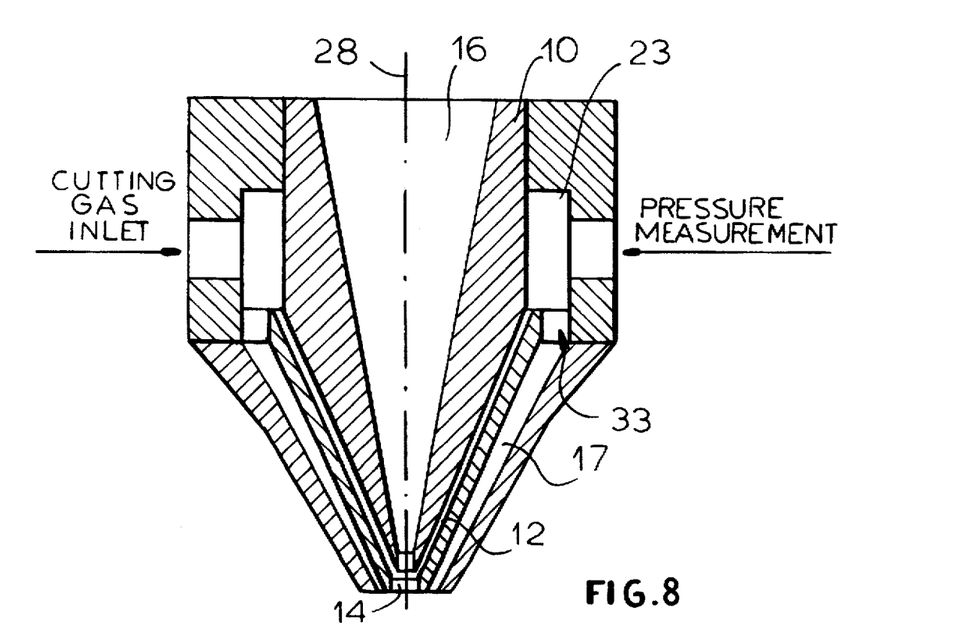

An equally concentric arrangement of gas stream separated from each other is to be expected with the construction of the nozzle according to FIG. 8. This nozzle has however the particular feature that both annular gaps 12, 17 are connected to the same plenum 23, whereby the annular gap 17 has supply bores 33 distributed over its circumference.

Figure 9:
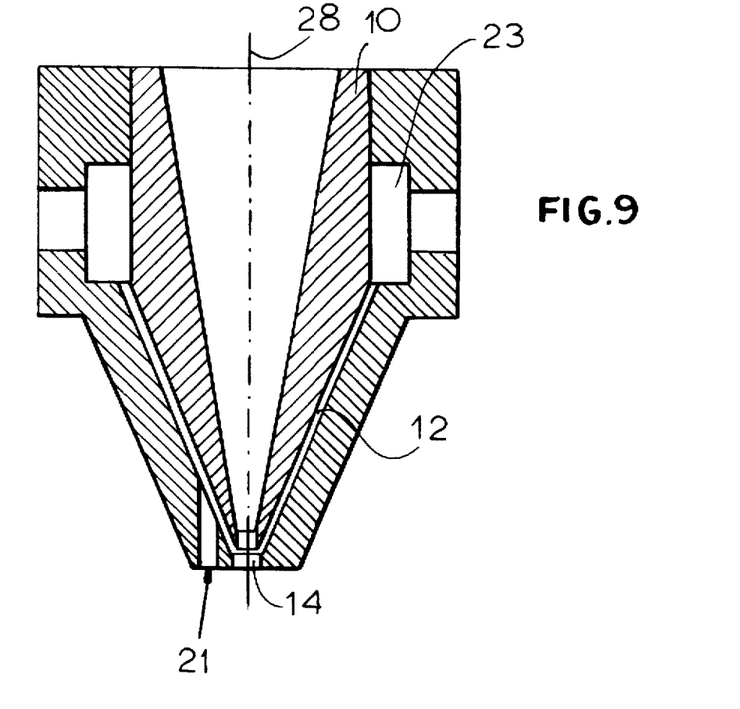
FIGS. 9 and 10 are cross sectional views of two embodiments of the nozzle assembly according to the invention with non-concentric additional gas streams.

It is self-understood that a nozzle assembly according to FIG. 8 has a comparatively high consumption of gas because of the outer, spaced away additional gas stream. When this gas consumption has to be reduced, a nozzle assembly according to FIG. 9 can be employed, wherein the annular gap 12 not only feeds the outlet bore 14, but also a bore 21 which is arranged parallel to the beam axis 28 and at a distance therefrom, and correspondingly produces a second stream with a comparatively large cross section.

Figure 10:
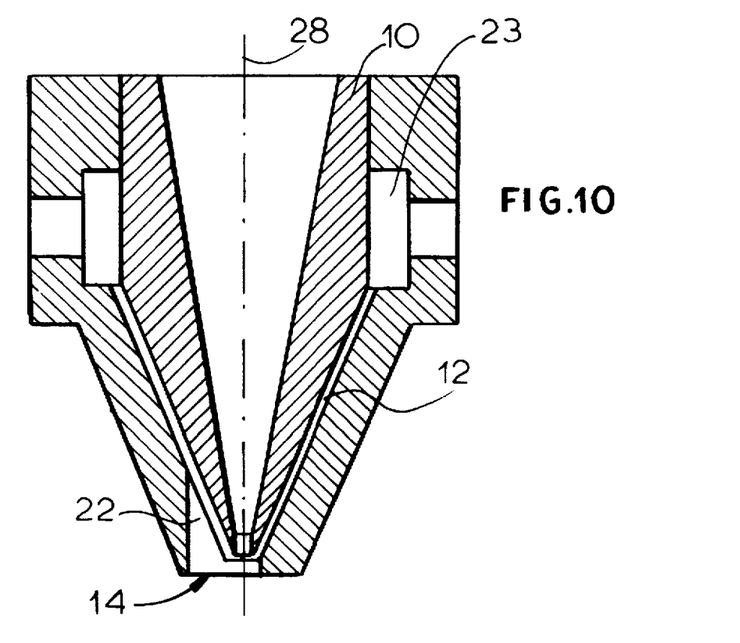

It is possible to shape the additional gas stream so that it is present at a distance from the laser beam axis 28, as well as connected with the gas stream of the outlet bore 14. For this purposes the nozzle sleeve 13 is provided with a slot 22 extending vertically from the annular gap 12 and having an oblong mouth, wherein the outlet bore 14 is integrated. This is shown in FIG. 10.

We claim:

1. A nozzle assembly for laser beam cutting, comprising:
   a frustoconical nozzle body having an inner frustoconical wall converging to a cylindrical outlet passage and generally following convergence of a laser beam traveling the interior of said nozzle body, said nozzle body having an external frustoconical wall;

means for focusing a laser beam through said nozzle body whereby said laser beam emerges from said passage to cut a workpiece spaced from said nozzle body;

at least one outer nozzle sleeve surrounding said nozzle body and having a frustoconical wall spaced form said outer frustoconical wall of said nozzle body by a constant width measured perpendicularly to said walls and forming an annular clearance converging toward an outlet of said nozzle with the sleeve located ahead of said passage in a direction of said workpiece and of a diameter exceeding a diameter of said passage, said annular clearance having a transition cross section from said width to said outlet measured perpendicular to said frustoconical outer wall of said nozzle body which is substantially equal in cross sectional area to that of said outlet;

a plenum formed between said nozzle body and said nozzle sleeve and communicating with said annular clearance; and means for feeding a cutting gas to said plenum whereby said cutting gas is accelerated through said clearance and emerges in a cutting gas stream from said outlet, said annular clearance and a pressure of said gas admitted to said plenum being dimensioned so that said gas is accelerated to a maximum velocity equal to the speed of sound in said clearance.

2. The nozzle assembly defined in claim 1 wherein said width is dimensioned as follows:

$$s = D/(2 \cos (\alpha_s)) * (1-(1-\cos (\alpha_s))0.5)$$

s=gap width
D=diameter of the outlet bore
$\alpha_s$=inclination angle of the annular gap.

3. The nozzle assembly defined in claim 2, further comprising means ahead of said outlet forming a recess enabling expansion of said stream to supersonic speed.

4. The nozzle assembly defined in claim 2 wherein the diameter of said passage is at least equal to 1.5 times the diameter of said laser beam where said laser beam passes through said passage.

5. The nozzle assembly defined in claim 2, further comprising a beam transmitting elements bridging said inner frustoconical wall and pressure relief bores extending through said nozzle body between said element and said passage.

6. The nozzle assembly defined in claim 2, further comprising means for admitting gas to an interior of said nozzle body.

7. The nozzle assembly defined in claim 2, further comprising at least one additional sleeve surrounding the first mentioned sleeve and forming at least one converging gap coaxial with said clearance and surrounding said gap opening at said outlet.

8. The nozzle assembly defined in claim 7, further comprising means for feeding another gas to said gap.

9. The nozzle assembly defined in claim 7, further comprising means for feeding said gas to said gap.

* * * * *